United States Patent
Sakaue et al.

(10) Patent No.: US 9,547,021 B2
(45) Date of Patent: Jan. 17, 2017

(54) ACCELERATION SENSOR

(71) Applicant: FUJI ELECTRIC CO., LTD., Kawasaki-shi (JP)

(72) Inventors: Satoru Sakaue, Hino (JP); Hironobu Yao, Hino (JP); Masami Kishiro, Hino (JP); Takeshi Suzuki, Zushi (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 302 days.

(21) Appl. No.: 14/350,806

(22) PCT Filed: Nov. 12, 2012

(86) PCT No.: PCT/JP2012/007257
§ 371 (c)(1),
(2) Date: Apr. 9, 2014

(87) PCT Pub. No.: WO2013/073162
PCT Pub. Date: May 23, 2013

(65) Prior Publication Data
US 2014/0251013 A1     Sep. 11, 2014

(30) Foreign Application Priority Data
Nov. 14, 2011  (JP) ................. 2011-248862

(51) Int. Cl.
*G01P 15/125*  (2006.01)
*G01P 15/18*   (2013.01)
*G01P 15/08*   (2006.01)

(52) U.S. Cl.
CPC ............ *G01P 15/125* (2013.01); *G01P 15/18* (2013.01); *G01P 2015/084* (2013.01); *G01P 2015/0871* (2013.01); *G01P 2015/0882* (2013.01)

(58) Field of Classification Search
CPC ......... G01P 15/125; G01P 15/08; G01P 15/18; G01P 15/0802; G01P 15/131; G01P 15/097
(Continued)

(56) References Cited

U.S. PATENT DOCUMENTS 6,528,724 B1    3/2003  Yoshida et al.
2001/0025529 A1 10/2001 Murata et al.
(Continued)

FOREIGN PATENT DOCUMENTS

CN  201569670 U    9/2010
JP  H06-34654 A    2/1994
(Continued)

OTHER PUBLICATIONS

Chinese Journal of Mechanical Engineering, vol. 40 No. 3, Mar. 2004.
(Continued)

*Primary Examiner* — Helen Kwok
(74) *Attorney, Agent, or Firm* — Rabin & Berdo, P.C.

(57) ABSTRACT

An acceleration sensor can ensure rigidity of its movable electrode despite a large number of through-holes formed in the movable electrode. The acceleration sensor has an SOI substrate in which a silicon oxide layer is formed on a silicon support layer and an active silicon layer is formed on the silicon oxide layer, wherein the active silicon layer of the SOI substrate has a movable electrode supported by elastic beams and configured with a weight, and also has fixed electrodes disposed in a fixed manner around the movable electrode to face the movable electrode, and wherein through-holes penetrating in a Z-axis direction are formed over the entire surface on the inner side of an outer circumference to which the elastic beams of the movable electrode are connected.

16 Claims, 5 Drawing Sheets

(58) Field of Classification Search
USPC .................. 73/514.32, 514.36, 514.38, 510
See application file for complete search history.

(56) References Cited

U.S. PATENT DOCUMENTS

| | | | |
|---|---|---|---|
| 2003/0115960 A1 | 6/2003 | Franz et al. | |
| 2009/0090987 A1* | 4/2009 | Yoshikawa | B81C 1/00476 |
| | | | 257/415 |
| 2009/0152654 A1* | 6/2009 | Classen | G01P 15/125 |
| | | | 257/415 |
| 2009/0277267 A1* | 11/2009 | Wang | B81C 1/00182 |
| | | | 73/514.32 |
| 2010/0117167 A1* | 5/2010 | Yokura | G01P 1/023 |
| | | | 257/415 |
| 2010/0257933 A1* | 10/2010 | Verjus | G01C 19/5755 |
| | | | 73/504.04 |
| 2011/0162453 A1* | 7/2011 | Wang | G01P 15/18 |
| | | | 73/514.32 |
| 2012/0025333 A1* | 2/2012 | Yoshida | B81C 1/00587 |
| | | | 257/415 |
| 2014/0306623 A1* | 10/2014 | Caffee | H02N 1/006 |
| | | | 318/116 |

FOREIGN PATENT DOCUMENTS

| | | |
|---|---|---|
| JP | H09-292409 A | 11/1997 |
| JP | 2002-005954 A | 1/2002 |
| JP | 2003-519384 A | 6/2003 |
| JP | 2004-069541 A | 3/2004 |
| JP | 2008-309657 A | 12/2008 |
| WO | WO-01/53194 A1 | 7/2001 |

OTHER PUBLICATIONS

Chinese Office Action with translation dated Jul. 31, 2015.
Chinese Office Action with translation dated Jan. 20, 2015.

* cited by examiner

ACCELERATION SENSOR

TECHNICAL FIELD

The present invention relates to an acceleration sensor that has an SOI substrate in which a silicon oxide layer is formed on a silicon support layer and an active silicon layer is formed on the silicon oxide layer, the active silicon layer of the SOI substrate being configured to have a movable electrode and a fixed electrode disposed around the movable electrode in such a manner as to face the movable electrode.

BACKGROUND ART

A capacitance semiconductor sensor is proposed as this type of acceleration sensor. In the capacitance semiconductor sensor, movable electrodes are disposed on the front and rear sides of a fixed electrode, with a predetermined distance between each movable electrode and the fixed electrode, in such a manner that detection surfaces of the movable electrodes face detection surfaces of the fixed electrode, and a through-hole is formed in such a manner as to penetrate from the detection surfaces of the movable and fixed electrodes to the surfaces opposite thereto, to reduce air damping generated between each movable electrode and the fixed electrode (see Patent Document 1, for example).
Patent Document 1: Japanese Patent Application Publication No. 2004-69541

According to the prior art disclosed in Patent Document 1, the movable electrodes are disposed on the front and rear sides of the fixed electrode, with a predetermined distance between each movable electrode and the fixed electrode, in such a manner that the detection surfaces of the movable electrodes face the detection surfaces of the fixed electrode, and the through-hole is formed in the middle of this structure in such a manner as to penetrate from the detection surfaces of the movable and fixed electrodes to the surfaces opposite thereto, to reduce air damping generated between each movable electrode and the fixed electrode.

SUMMARY

However, although this prior art disclosed in Patent Document 1 is capable of reducing air damping by means of the through-hole formed in the movable electrodes and the fixed electrode, this single through-hole formed in the middle of the structure is not enough to exert the effect of reducing the air damping. The problem with this prior art, therefore, is that a great air damping effect cannot be obtained when the movable electrodes vibrate at high frequencies. In addition, the more the through-hole is formed, the lower the rigidity of the movable electrodes become, which means there is a trade-off between the number of through-holes and the rigidity of the movable electrodes.

The present invention was contrived in view of these unsolved problems described above, and an object of the present invention is to provide an acceleration sensor in which rigidity of its movable electrode can be ensured despite a large number of through-holes formed in the movable electrode.

In order to achieve this object, a first aspect of the acceleration sensor according to the present invention is an acceleration sensor having an SOI substrate in which a silicon oxide layer is formed on a silicon support layer and an active silicon layer is formed on the silicon oxide layer, the active silicon layer of the SOI substrate being configured to have a movable electrode supported by elastic beams and configured with a weight, and also have fixed electrodes disposed in a fixed manner around the movable electrode to face the movable electrode, and through-holes penetrating in a Z-axis direction being formed over the entire surface on the inner side of an outer circumference to which the elastic beams of the movable electrode are connected.

In a second aspect of the acceleration sensor according to the present invention, the through-holes are disposed in block-shaped areas separately.

In a third aspect of the acceleration sensor according to the present invention, the block-shaped areas are arranged in a lattice-like manner.

In a fourth aspect of the acceleration sensor according to the present invention, the through-holes are configured by alternately disposing a first block-shaped area and a second block-shaped area in a two-dimensional manner, the first block-shaped area having a predetermined number of long through-holes formed in parallel, and the second block-shaped area having a predetermined number of long through-holes formed in parallel in a direction perpendicular to a direction of the long through-holes of the first block-shaped areas.

In a fifth aspect of the acceleration sensor according to the present invention, the through-holes are configured by alternately disposing a first block-shaped area, a second block-shaped area, and a third block-shaped area in a two-dimensional manner, the first block-shaped area having a predetermined number of long through-holes formed in parallel, the second block-shaped area having a predetermined number of long through-holes formed in parallel in a direction perpendicular to a direction of the long through-holes of the first block-shaped area, and the third block-shaped area having no long through-holes.

In a sixth aspect of the acceleration sensor according to the present invention, a width of a connecting portion between the long through-holes in the first block-shaped area and in the second block-shaped area is wider than that obtained when an aperture is 50%.

In a seventh aspect of the acceleration sensor according to the present invention, a stopper is formed to extend downward from the outer circumference on the lower surface of the movable electrode.

According to the present invention, owing to the through-holes formed over the entire surface inside an outer circumferential part coupled to an elastic beam of the movable electrode, the through-holes penetrating in the Z-axis direction, air damping can be reduced significantly with the large number of through-holes, while keeping the rigidity in the outer circumferential part.

DETAILED DESCRIPTION

Embodiments of the present invention are described hereinafter with reference to the drawings.

Figure 1:
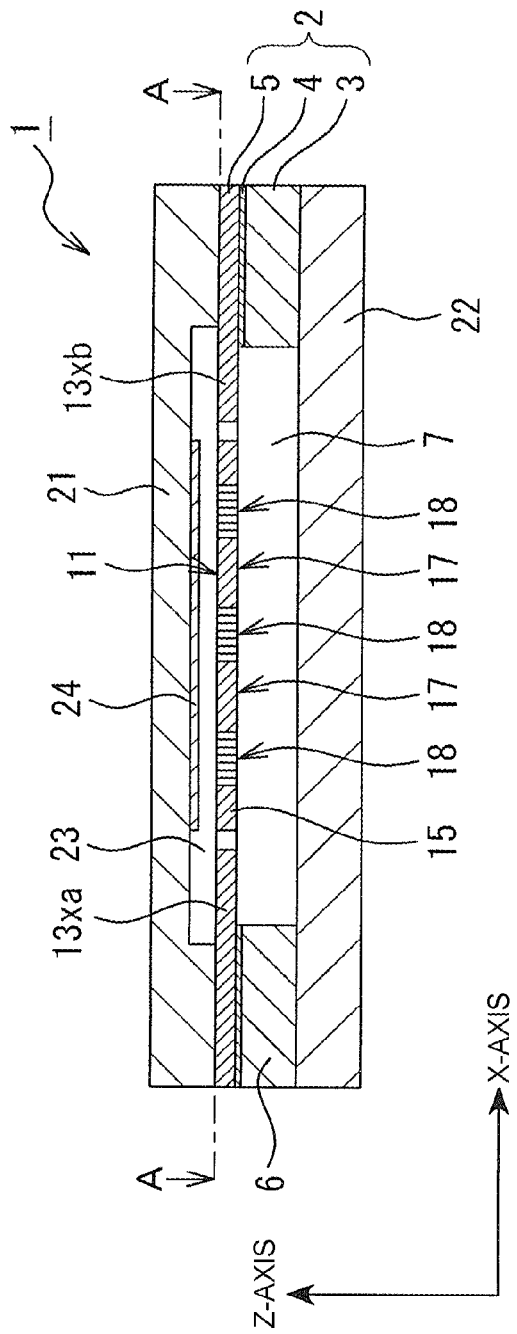
FIG. 1 is a cross-sectional diagram showing a first embodiment of an acceleration sensor according to the present invention.
Figure 2:
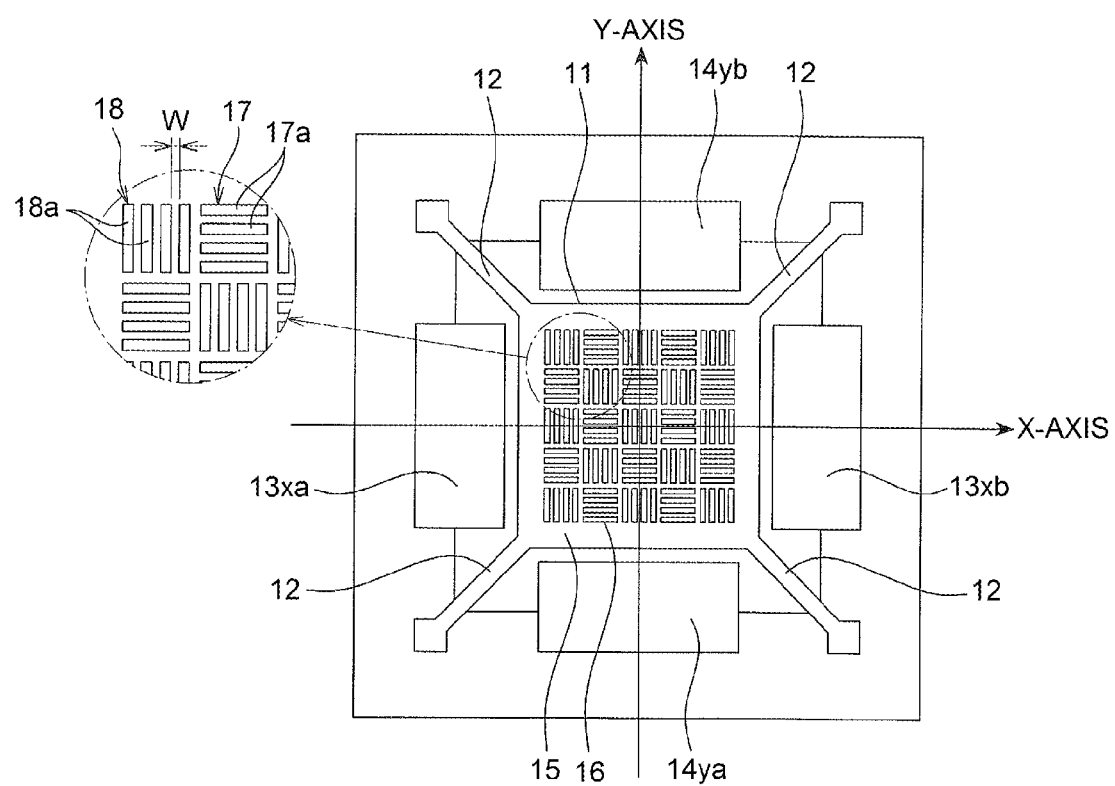
FIG. 2 is an end view taken along line A-A of FIG. 1.

FIG. 1 is a cross-sectional diagram showing an example of an acceleration sensor according to the present invention. FIG. 2 is an end view taken along line A-A of FIG. 1.

In FIG. 1, reference numeral 1 represents an acceleration sensor, which is configured by a SOI (Silicon-On-Insulator) substrate 2. This SOI substrate 2 is configured by a silicon support layer 3 provided as an underlayer, a silicon oxide layer 4 formed on the silicon support layer 3, and an active silicon layer 5 formed on the silicon oxide layer 4.

In the silicon support layer 3 and the silicon oxide layer 4, a space portion 7 is formed by etching and removing the central portions of the silicon support layer 3 and the silicon oxide layer 4, leaving a square frame portion 6.

The active silicon layer 5 on the silicon oxide layer 4, on the other hand, is, for example, anisotropically dry-etched to form a movable electrode 11 in a central portion, the movable electrode 11 functioning as a square weight, elastic beams 12 extending diagonally outward from the four corners of the movable electrode 11, X-axis direction fixed electrodes 13xa, 13xb and Y-axis direction fixed electrodes 14ya, 14yb that face the four sides of the movable electrode 11 with predetermined gaps therebetween.

A number of through-holes 16 are formed in such a manner as to be shaped along a Z-direction, or vertically, inside a square frame portion 15 where the movable electrode 11 and the beams 12 are connected. As shown by the enlarged diagram in FIG. 2, the through-holes 16 are configured by arranging first block-shaped areas 17 and second block-shaped areas 18 alternately in a two-dimensional manner in an X-axis direction and a Y-axis direction, the first block-shaped areas 17 each having, for example, four long through-holes 17a that extend in the X-axis direction and are arranged in parallel at a predetermined interval, and the second block-shaped areas 18 each having, for example, four long through-holes 18a that extend in the Y-axis direction and are arranged in parallel at a predetermined interval.

An upper surface and a lower surface of the SOI substrate 2 are covered with, respectively, an upper substrate and a lower substrate 22 which are configured by, for example, glass substrates. As shown in FIG. 1, the upper substrate 21 has a concave portion 23, slightly wider than the space portion 7, that is formed to face the movable electrode 11, and a Z-axis direction fixed electrode 24 formed at the bottom of the concave portion 23 and facing the movable electrode 11.

Operations according to the first embodiment are described next. In the movable electrode 11 formed on the active silicon layer 5 of the SOI substrate 2, the elastic beams 12 extending diagonally outward from the four corners of the movable electrode 11 are fixed to an upper surface of the frame portion 6 configured by the silicon support layer 3 and the silicon oxide layer 4.

Because the movable electrode 11 is supported by the four elastic beams 12, applying an X-axis direction rightward (or leftward) acceleration to the acceleration sensor 1 results in bending the elastic beams 12, moving the movable electrode 11 to the right (or to the left). As a result, the gap between the right end of the movable electrode 11 and the X-axis direction fixed electrode 13xb becomes narrow (or wide), increasing (or lowering) the capacitance therebetween, whereas the gap between the left end of the movable electrode 11 and the X-axis direction fixed electrode 13xa becomes wide (or narrow), lowering (or increasing) the capacitance therebetween.

A capacitance detection circuit, not shown, is used to detect the difference in capacitance between the gap between the movable electrode 11 and the X-axis direction fixed electrode 13xa and the gap between the movable electrode and the X-axis direction fixed electrode 13xb. Consequently, positive and negative acceleration detection signals corresponding to accelerations can be obtained.

Similarly, applying a Y-axis direction acceleration to the acceleration sensor 1 results in moving the movable electrode 11 forward or backward in FIG. 2, reducing or increasing the capacitance between the movable electrode 11 and the Y-axis direction fixed electrode 14ya and the capacitance between the movable electrode 11 and the Y-axis direction fixed electrode 14yb. Thus, positive and negative acceleration detection signals can be obtained by computing the difference in capacitance similarly using the capacitance detection circuit.

In addition, when a Z-axis direction acceleration is applied to the acceleration sensor 1, since, with respect to the Z-axis direction, the Z-axis direction fixed electrode 24 is provided only in the upper part of the acceleration sensor 1, a capacitance between the Z-axis direction fixed electrode 24 and the movable electrode 11 is detected by a capacitance detection circuit using, for example, a dummy capacitance, thereby obtaining a Z-axis direction acceleration detection signal.

When the movable electrode 11 moves in the Z-axis direction, the movable electrode 11 moves vertically as a result of deflection and stretching of the elastically deformed elastic beams 12. When the movable electrode 11 moves upward or downward in this case, the space between the movable electrode 11 and the Z-axis direction fixed electrode 24 becomes relatively narrow, possibly causing air damping upon the movement of the movable electrode 11 in the Z-axis direction.

In the present embodiment, however, the first block-shaped areas 17 and the second block-shaped areas 18 are arranged alternately in a two-dimensional manner in the X and Y directions, with at least a predetermined interval wider than the connecting portions between the long through-holes 17a of each first block-shaped area 17. The first block-shaped areas 17 are formed over the entire region on the inner side except the frame portion 15 formed on the outer circumference of the movable electrode 11, each having the long through-holes 17a extending in the X-axis direction and formed in parallel at a predetermined interval. The second block-shaped areas 18, too, are formed over the entire region on the inner side except the frame portion 15 formed on the outer circumference of the movable electrode 11, each having the long through-holes 18a extending in the Y-axis direction and formed in parallel at a predetermined interval. Thus, air on the front side and the rear side of the movable electrode 11 can flow in and out through the long through-holes 17a and 18a, securely preventing the occurrence of air damping. In this manner, reduction in frequency characteristics due to air damping can be prevented even when high-frequency acceleration is input in the Z-direction.

Moreover, alternately arranging the first block-shaped areas 17 and the second block-shaped areas 18 in a two-dimensional manner can enhance the rigidity of the movable electrode 11 more than when the through-holes are arranged in one direction. Thus, the acceleration sensor 1 can withstand long-term use, improving its reliability.

The first block-shaped areas 17 and the second block-shaped areas 18 are disposed alternately in a two-dimensional manner and in a lattice-like manner in the entire region on the inner side expect the outer circumferential frame portion 15 of the movable electrode 11. Consequently, the boundary regions between the first and second block-shaped areas 17 and 18 where no through-holes are formed are connected in a lattice-like manner in the entire region on the inner side except the outer circumferential frame portion 15 of the movable electrode 11, forming a lattice-like structure. This structure can further enhance the rigidity of the movable electrode 11.

The rigidity of the movable electrode 11 can be further enhanced by making the width of each of the abovementioned regions where no through-holes are formed greater than the width of each connecting portion between the long through-holes 17a of each of the first block-shaped areas 17 and the width of each connecting portion between the long through-holes 18a of each of the second block-shaped areas 18.

Figure 3:
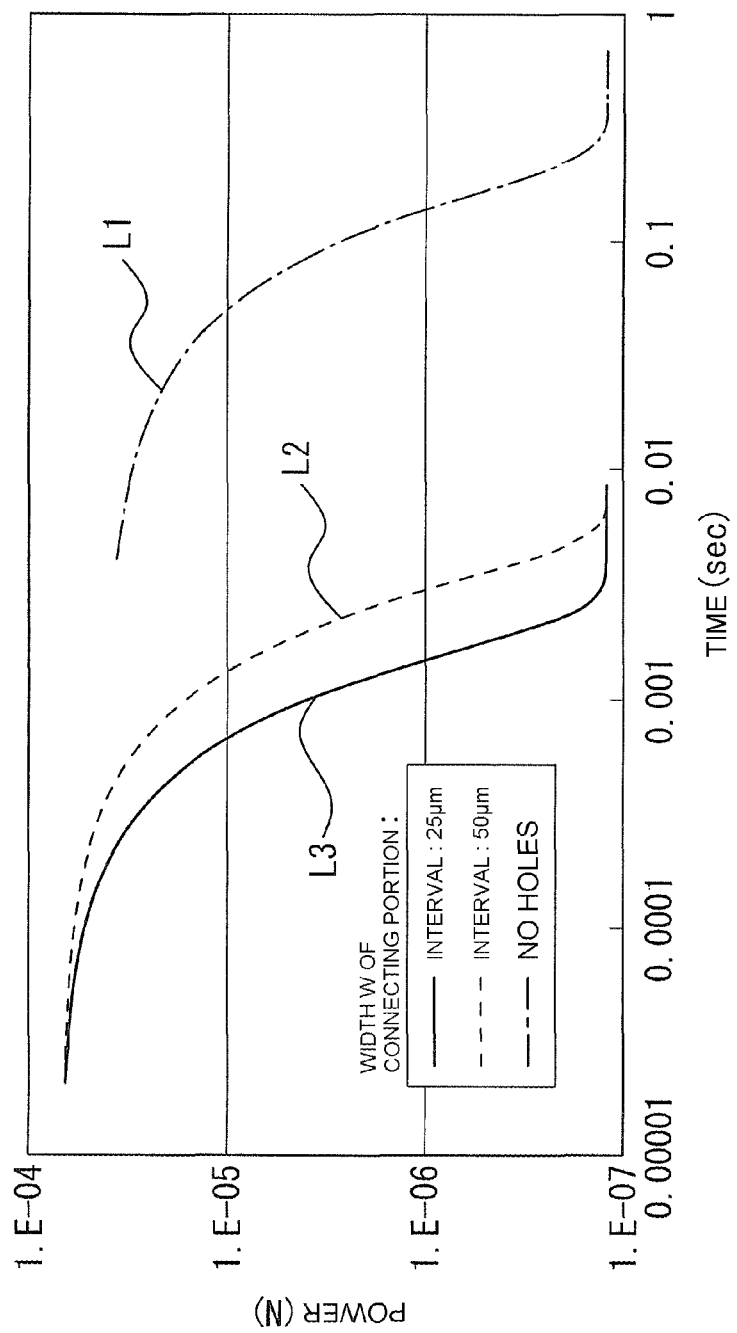
FIG. 3 is a characteristic line diagram showing a relationship between an interval between through-holes and a decay time according to the first embodiment.

FIG. 3 shows the width of each connecting portion between the long through-holes 17a of each of the first block-shaped areas 17 and the width of each connecting portion between the long through-holes 18a of each of the second block-shaped areas 18, which were obtained as a result of changing and simulating a width W of the connecting portion between one of the long through-holes 17a and one of the long through-holes 18a when the width of each long through-hole 18a is 5 μm. In FIG. 3, the simulation was performed when the through-holes 16 were not formed in the movable electrode 11 and when the width W of the connecting portion between the long through-hole 17a and the long through-hole 18a was 25 μm and 50 μm.

The horizontal axis of the graph showing the simulation results represents the time [sec], while the vertical axis represents the power [N]. Without any through-holes 16, the time between application of power and decay of the power is long, as shown by a characteristic curve L1. However, when the width W of the connecting portion between the long through-hole 17a and the long through-hole 18a is 50 μm, the power decays quicker than that shown by the characteristic curve L1 since the application of the power, as shown by a characteristic curve L2. When the width W of the connecting portion between the long through-hole 17a and the long through-hole 18a is 25 μm, the power decays even quicker than that shown by the characteristic curve L2, as shown by a characteristic curve L3.

The simulation results show that the applied power decays quick as the width W of the connecting portion between the long through-hole 17a and the long through-hole 18a becomes narrower than 50 μm. However, narrowing the width W of the connecting portion between the long through-hole 17a and the long through-hole 18a lowers the rigidity of the movable electrode 11 and the function thereof as a weight. Therefore, the rigidity of the movable electrode 11 can be secured while improving the frequency characteristics by making the width W of the connecting portion between the long through-hole 17a and the long through-hole 18a wider than the width W of the same obtained when an aperture is 50%.

Figure 4:
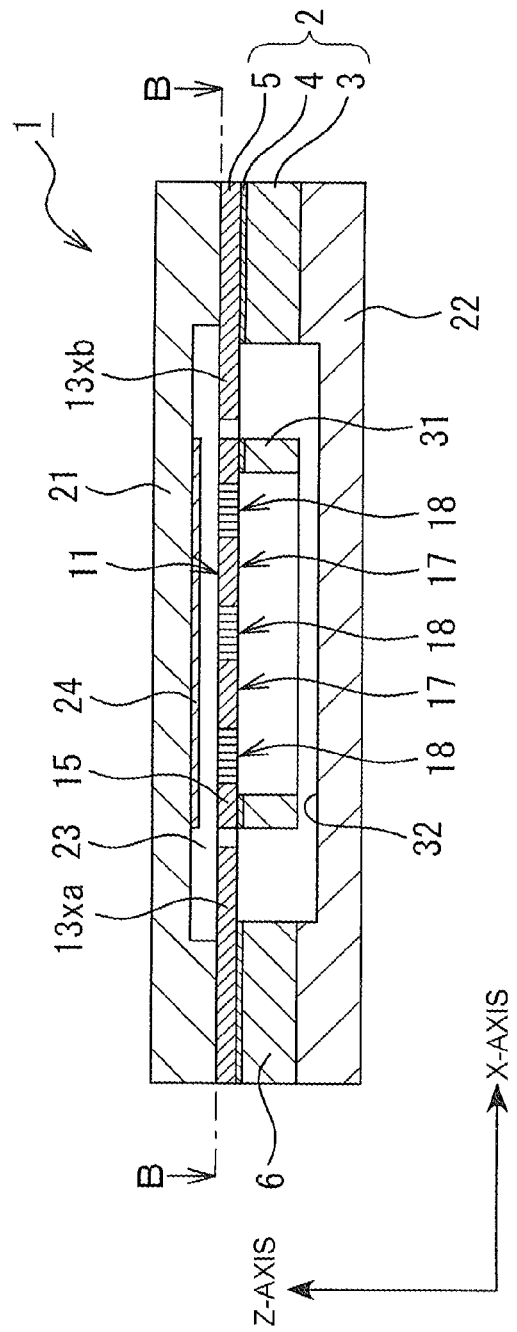
FIG. 4 is a cross-sectional diagram showing a second embodiment of the acceleration sensor according to the present invention.
Figure 5:
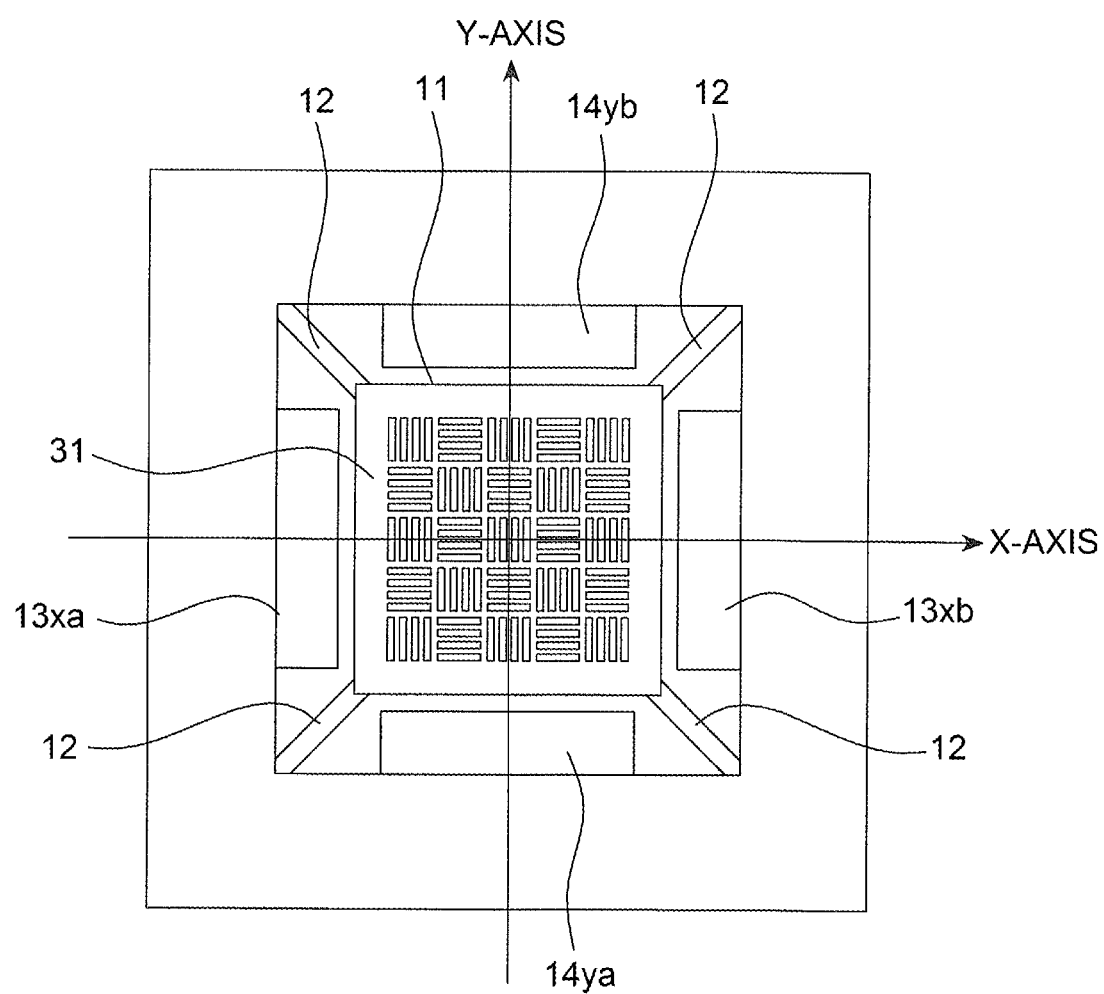
FIG. 5 is an end view taken along line B-B of FIG. 4.

A second embodiment of the present invention is described next with reference to FIGS. 4 and 5.

The second embodiment is configured to prevent the movable electrode 11 from being excessively displaced.

In other words, the second embodiment has the same configuration as the first embodiment except that a square frame-like stopper 31 is not etched but is formed in such a manner as to extend downward from the movable electrode 11 at the position facing the frame portion 15. In FIG. 2, the same reference numerals are denoted to the parts common to FIG. 1, and detailed explanations thereof are omitted accordingly. A concave portion 32, which corresponds to the space portion 7 of the silicon support layer 3 and the silicon oxide layer 4 and is deep enough to accommodate an allowable displacement of the movable electrode 11, is formed on the lower substrate 22 facing the stopper 31.

According to the second embodiment, the stopper 31 is provided in the place corresponding to the outer circumferential frame portion 15 on a lower surface of the movable electrode 11, where the first block-shaped areas 17 and the second block-shaped areas 18 are not formed. Due to such a configuration, the stopper 31 comes into abutment with the bottom of the concave portion 32 of the lower substrate 22 when the movable electrode 11 is displaced extremely significantly due to a large acceleration applied to the acceleration sensor 1, stopping the movable electrode 11 from moving further downward. Such a configuration can securely prevent excessive displacement of the movable electrode 11 and hence damage to the movable electrode 11 and the elastic beams 12. Thus, the acceleration sensor 1 can withstand long-term use, improving its reliability.

In the second embodiment the stopper 31 is formed into a square frame; however, the present invention is not limited to such a configuration. Instead of forming the stopper 31 into a ring, the stopper 31 may be segmented or formed into a plurality of columns.

According to the first and second embodiments, the long through-holes 17a and 18a of the first and second block-shaped areas 17 and 18 are formed to extend in the X-axis direction and the Y-axis direction. However, the present invention is not limited to such a configuration. For instance, the long through-holes 17a of the first block-shaped areas 17 may be formed in such a manner as to extend at an angle of, for example, 45° with respect to the X-axis, whereas the long through-holes 18a of the second block-shaped areas 18 may be formed in such a manner as to extend at an angle of, for example, −45° with respect to the X-axis. Basically the direction of extension of the long through-holes 17a of the first block-shaped areas 17 and the direction of extension of the long through-holes 18a of the second block-shaped areas 18 may be perpendicular to or intersect with each other.

According to the first and second embodiments, the first block-shaped areas 17 and the second block-shaped areas 18 are disposed alternately in a two-dimensional manner; however, the present invention is not limited to such a configuration. A third block-shaped area with no through-hole may be interposed between each of the first block-shaped areas 17 and each of the second block-shaped areas 18.

Further, according to the first and second embodiments, the width of the long through-holes 17a and 18a of the first and second block-shaped areas 17 and 18 and the number of these long through-holes are the same as the width of the connecting portions between these long through-holes. However, the present invention is not limited to such a configuration. The width of the long through-holes 17a and 18a of the first and second block-shaped areas 17 and 18 may be different from the width of the connecting portions between the long through-holes. In addition, the aperture may increase gradually toward the center of the first block-shaped area 17 and the center of the second block-shaped area.

According to the first and second embodiments, the long through-holes 17a and the long through-holes 18a are formed in the first block-shaped area 17 and the second block-shaped area 18 respectively; however, the present invention is not limited to such a configuration. In place of the long through-holes, one through-hole may be formed in any shape in each of block-shaped areas, and these block-shaped areas may be arranged in a lattice-like manner. In this case, the width of a connecting portion between the block-shaped areas can be increased by arranging the block-shaped areas in a lattice-like manner, the block-shaped areas each having one through-hole. In this manner, the rigidity of the movable electrode 11 can further be improved.

INDUSTRIAL APPLICABILITY

The present invention can provide an acceleration sensor in which rigidity of its movable electrode thereof can be ensured despite a large number of through-holes formed in the movable electrode.

EXPLANATION OF REFERENCE NUMERALS

1 . . . Acceleration sensor, 2 . . . SOI substrate, 3 . . . Silicon support layer, 4 . . . Silicon oxide layer, 5 . . . Active silicon layer, 6 . . . Frame portion, 7 . . . Space portion, 11 . . . Movable electrode, 12 . . . Elastic beam, 13xa, 13xb . . . X-axis direction fixed electrode, 14ya, 14yb . . . Y-axis direction fixed electrode, 17 . . . First block-shaped area, 17a . . . Long through-hole, 18 . . . Second block-shaped area, 18a . . . Long through-hole, 21 . . . Upper substrate, 22 . . . Lower substrate, 23 . . . Concave portion, 24 . . . Z-axis direction fixed electrode, 31 . . . Stopper

The invention claimed is:

1. An acceleration sensor, comprising an SOI substrate in which a silicon oxide layer is formed on a silicon support layer and an active silicon layer is formed on the silicon oxide layer,
the active silicon layer of the SOI substrate being formed to have a movable electrode supported by elastic beams and configured with a weight, and also have fixed electrodes disposed in a fixed manner around the movable electrode to face the movable electrode, and
through-holes penetrating in a Z-axis direction being formed over a surface on an inner side of an outer border to which the elastic beams of the movable electrode are connected, and the through-holes extending in different directions in a pattern that repeats in each of quadrants of an area defined by the border;
wherein the pattern that repeats includes the through-holes alternately disposed in a first block-shaped area and a second block-shaped area in a two-dimensional manner, the first block-shaped area having a predetermined number of long through-holes formed in parallel, and the second block-shaped area having a predetermined number of long through-holes formed in parallel in a direction perpendicular to a direction of the long through-holes of the first block-shaped areas.

2. The acceleration sensor according to claim 1, wherein the through-holes are disposed in the first block-shaped area and the second block-shaped area separately.

3. The acceleration sensor according to claim 2, wherein the first block-shaped area and the second block-shaped area are arranged in a lattice-like manner.

4. The acceleration sensor according to claim 2, wherein the through-holes are further configured by alternately disposing the first block-shaped area, the second block-shaped area, and a third block-shaped area in a two-dimensional manner, the third block-shaped area having no long through-holes.

5. The acceleration sensor according to claim 3, wherein a width of a connecting portion between the long through-holes in the first block-shaped area and in the second block-shaped area is wider than that obtained when an aperture is 50%.

6. The acceleration sensor according to claim 1, wherein a stopper is formed to extend downward from an outer circumference on a lower surface of the movable electrode.

7. The acceleration sensor according to claim 1, wherein a width of a connecting portion between the long through-holes in the first block-shaped area and in the second block-shaped area is wider than that obtained when an aperture is 50%.

8. The acceleration sensor according to claim 4, wherein a width of a connecting portion between the long through-holes in the first block-shaped area and in the second block-shaped area is wider than that obtained when an aperture is 50%.

9. The acceleration sensor according to claim 2, wherein a stopper is formed to extend downward from an outer circumference on a lower surface of the movable electrode.

10. The acceleration sensor according to claim 3, wherein a stopper is formed to extend downward from an outer circumference on a lower surface of the movable electrode.

11. The acceleration sensor according to claim 4, wherein a stopper is formed to extend downward from an outer circumference on a lower surface of the movable electrode.

12. The acceleration sensor according to claim 5, wherein a stopper is formed to extend downward from an outer circumference on a lower surface of the movable electrode.

13. An acceleration sensor, comprising:
a frame; and
a movable electrode attached to the frame;
wherein the movable electrode has formed therein an array of rectangular holes arranged in alternating sections of first and second patterns;
the first pattern of the alternating sections having a group of the rectangular holes parallel to each other and lying along a first direction, and the second pattern of the alternating sections having a group of the rectangular holes parallel to each other and lying along a second direction perpendicular to the first direction, the first pattern and the second pattern repeating in each of quadrants of an area of the array.

14. The acceleration sensor of claim 13, wherein the movable electrode is attached to the frame by flexible members.

15. The acceleration sensor of claim 13, wherein the movable electrode is disposed opposite a fixed electrode in a Z-axis direction.

16. The acceleration sensor of claim 15, wherein the movable electrode is disposed between a pair of fixed electrodes in an X-axis direction and between another pair of fixed electrodes in a Y-direction.

* * * * *